United States Patent [19]
Chen et al.

[11] Patent Number: 5,930,423
[45] Date of Patent: Jul. 27, 1999

[54] SEMICONDUCTOR OPTICAL WAVEGUIDE DEVICES WITH INTEGRATED BEAM EXPANDER COUPLED TO FLAT FIBERS

[75] Inventors: Chih-Hsiao Chen, Iselin; Uziel Koren, Fair Haven; Stephen Cason Shunk, Island Heights, all of N.J.

[73] Assignee: Lucent Technologies Inc., Murray Hill, N.J.

[21] Appl. No.: 08/892,784

[22] Filed: Jul. 15, 1997

[51] Int. Cl.[6] ................................................ G02B 6/30
[52] U.S. Cl. ................................ 385/49; 385/38; 385/43; 385/88; 385/89
[58] Field of Search .................................. 385/1, 2, 3, 4, 385/5, 6, 7, 8, 9, 10, 49, 88, 89, 90, 91, 92, 43, 38; 257/432

[56] References Cited

U.S. PATENT DOCUMENTS

| | | | |
|---|---|---|---|
| 4,294,510 | 10/1981 | Chappell | 350/96.17 |
| 4,358,851 | 11/1982 | Scifres et al. | 350/96.15 |
| 4,932,032 | 6/1990 | Koch et al. | 372/45 |
| 4,944,838 | 7/1990 | Koch et al. | 156/652 |
| 5,361,157 | 11/1994 | Ishikawa et al. | 385/9 |
| 5,579,155 | 11/1996 | Kitamura | 359/344 |

OTHER PUBLICATIONS

T. Brenner and H. Melchior, "Local Etch Rate Control of Masked InP/InGaAsP by Diffusion Limited Etching," Jouirnal of Electrochemical Soc., vol. 141 pp. 1954–1957 (1994).

U. Koren, et al., "Ppro–3, A New Process for Integration of Semiconductor Active and Passive Optical Waveguide Devices," 8th European Conference on Integrated Optics, Stockholm, EFB2, Apr. 1997.

M.A. Newkirk, et al. "1.5$\mu$m Multiquantum–Well Semiconductor Optical Amplfier with Tensile and Compressively Strained Wells for Polaraization–Independant Gain", IEEE Phot. Technol. Lett., vol. 14, pp.406–408 (Apr. 1993).

M. Bagley, et al., "Broadband Operation of InGaAsP–InGaAs GRIN–SC–MQW BH Amplifiers with 115mW Output Power" Electron. Lett., vol. 26, pp.512–513, 1990.

J.M. Wiesenfeld, et al. "High–speed Mulitple–quantumwell Optical Power Amplifier," IEEE Photon. Technol. Lett., vol. 4, pp. 708–711, 1992.

G. Eisenstein, et al. "Large and Small Signal Gain Characteristics of 1.5 $\mu$m Multiple Quantum Well Optical Amplfiers," Appl. Phys. Lett., vol. 56, pp. 1201–1203, 1990.

(List continued on next page.)

*Primary Examiner*—Hung N. Ngo

[57] ABSTRACT

An optical coupling system couples an optical fiber to an optical semiconductor device. A beam expander is disposed within the optical semiconductor so as to receive light from or transmit light into the optical fiber. The coupling is accomplished by disposing a layer of an index matching gel or epoxy on either surface of the semiconductor optical device or the end portion of the optical fiber and another layer of an antireflective material adjacent to the index matching gel or epoxy. The semiconductor device may include an array of optical devices, each coupled to a corresponding optical fiber via the arrangement that comprises the index matching gel and the antireflective material. The semiconductor device may also include an array of waveguides, each configured to receive light from a corresponding optical fiber.

28 Claims, 5 Drawing Sheets

OTHER PUBLICATIONS

T. L. Koch and Uziel Koren., "Semiconductor Phtonic Integrated Circuits," IEEE J. Quantum Electron. vol. QE–27, pp. 641–653, 1991.

M. Yamanishi and I. Suemune, "Comment on Polarization Dependent Momentum Matrix Elements in Quantum Well Lasers," Japan. J. Appl. Phys., vol. 23, pp. L35–L36, 1984.

U. Koren, et al. High Power Laser Amplifier Photonic Integrated Circuit for 1.48$\mu$m Wavelength Operation, Appl. Phys. Lett., vol. 59, pp. 2351–2353, 1991.

K. Magari, et al. "1.55$\mu$m Polarization–insensitive High––gain Tensile–strained–barrier MQW Optical Amplifier," IEEE Photon. Technol. Lett., vol. 3, pp. 998–1000, 1991.

B.I. Miller, et al., "Strain–compensated Strained–layer Superlattices for 1.5–82 m Wavelength Lasers" Appl. Phys. Lett. vol. 58, pp. 1952–1954, 1991.

U. Koren, et al., "Semi–insulating Blocked Planar Buried Heterostructure GaInAs–InP Laser with High Power and Hig Modulation Bandwidth," Electron. Lett., vol. 24, pp. 138–139, 1988.

H.M. Presby and C.A.Edwards, "Near 100% Efficient Fibre Microlenses," Electron. Lett., vol. 28, pp.582–584, 1992.

F. Mallecot, et al., "Hybrid Silica Multiwavelength Optical Source Realized by Passive Alignment" OFC 1995 Technical Digest, pp. 227–228, 1995.

SEMICONDUCTOR OPTICAL WAVEGUIDE DEVICES WITH INTEGRATED BEAM EXPANDER COUPLED TO FLAT FIBERS

FIELD OF THE INVENTION

This invention relates to optical systems and more specifically to an improved coupling between a waveguide, such as an optical fiber, and an optical device, such as one made of semiconductor material.

BACKGROUND OF THE INVENTION

Within recent years the number of electronic applications that employ optical devices has been rapidly increasing. Typically, optical fibers carry light signals that are coupled to a variety of optical devices, such as lasers, amplifiers, modulators, splitters, multiplexers/demultiplexers, routers, switches and receivers. As is well known, the use of optical fibers and devices leads to higher data through puts and increased communication channel bandwidths.

One drawback in employing optical fibers and optical devices is the need for reliable and accurate coupling between a fiber and an optical device. Typically, the diameter of a single mode fiber is approximately about 7 microns. The diameter of a waveguide employed in a semiconductor optical device is about 1.5 microns. Therefore, the coupling efficiency is small. One way to overcome coupling mismatch is to employ a fiber lens at the fiber end. Typically, a fiber lens is formed by etching the tip of the fiber end to define a convex shaped portion that acts as a lens. However, the process of forming a fiber lens is time consuming and requires an alignment accuracy in the order of ¹/₁₀th of micro resulting in a substantially costly optical coupling.

Another drawback in employing optical fibers and optical devices is optical index mismatching. Typically, the refractive index of a fiber material which is about 1.5, is different from the refractive index of a semiconductor optical device which is about 3.3. Therefore light traveling from a fiber to an optical device, or vice versa, experiences optical reflections. Conventional coupling systems employ anti-reflective coating material to provide a more suitable optical matching between the medium that light travels through. In the case of fiber to optical device coupling, because the optical fiber is made of glass, an air gap between the fiber end and the semiconductor surface is provided so that the fiber end would not damage the surface of the semiconductor optical device. Thus, the medium traveled by light comprises optical fiber to air and air to a semiconductor optical device. In order to alleviate reflection, it is necessary to treat the fiber end with an antireflective material that provides appropriate matching between glass and air. Furthermore, in order to alleviate reflection, between air and the semiconductor material, it is necessary to treat the semiconductor surface with an antireflective material that provides appropriate optical matching between air and the semiconductor. The process of treating antireflective materials on both optical fiber and semiconductor device is time consuming and leads to additional cost for coupling optical fibers to semiconductor optical devices.

Thus, there is a need for an improved coupling system that provides a reliable, accurate and expedient coupling between optical fibers and semiconductor optical devices.

SUMMARY OF THE INVENTION

In accordance with an exemplary embodiment of the present invention an optical coupling system used to couple an optical fiber to an optical semiconductor device in accordance with the present invention comprises a beam expander defined by a tapered waveguide disposed within said optical semiconductor device and configured to receive light from said optical fiber; an antireflective layer disposed on at least one surface of the semiconductor optical device or the optical fiber, such that the antireflective layer is made of a material that provides matching between the optical fiber material and the optical semiconductor material; an optical index matching, such as gel layer or epoxy layer, disposed over said antireflective layer, said optical index matching layer is configured to provide a space between the optical fiber and the semiconductor device.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1:
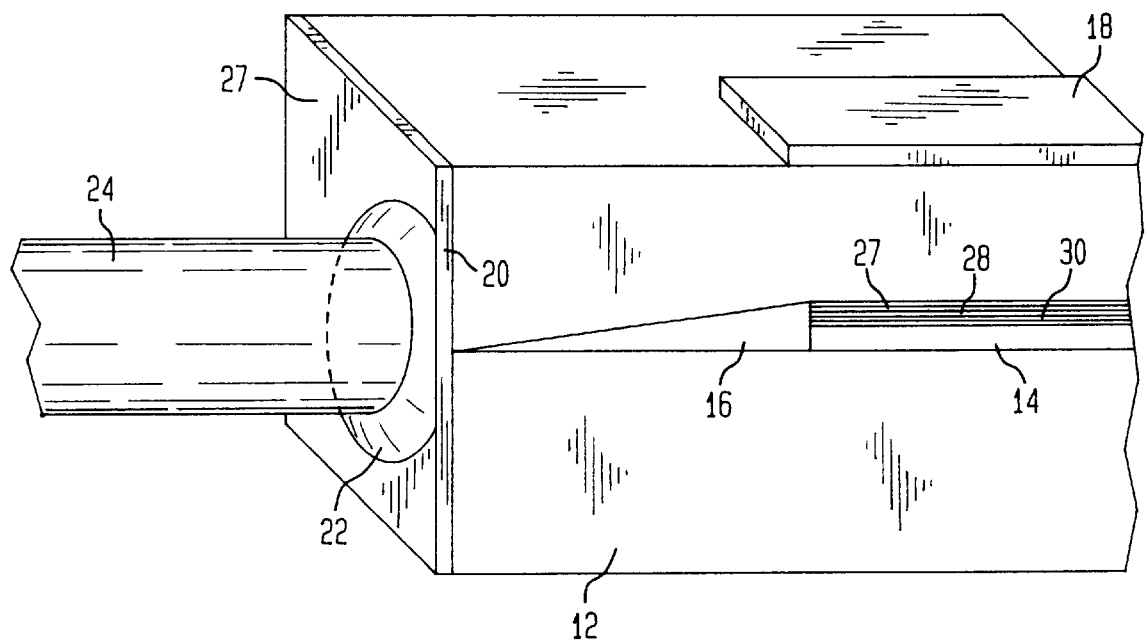
FIG. 1 illustrates a three dimensional illustration a coupling system in accordance with the present invention.

FIG. 1 illustrates a coupling arrangement in accordance with one embodiment of the present invention. Semiconductor optical device 12 is configured to function as an optical amplifier, although the invention is not limited in scope in that respect and other semiconductor optical devices, such as modulators, routers, receivers, multiplexers/demultiplexers and switches may be employed.

Semiconductor optical device 12 has a plurality of layers disposed over each other, which are not shown in detail herein. Semiconductor optical device 12 includes a beam expander 16, which is integrally coupled to an active section 14. In the present embodiment as illustrated in FIG. 1, the active section 14 may be an optical amplifier, although the invention is not limited in scope in that respect. Beam expander 16 is configured to receive light at one end of the semiconductor optical device, such as 26. It is noted that beam expander 16 may also be employed to provide an output light emanating from the semiconductor optical device.

The process of forming beam expander 16 and an active optical section 14, such as an optical amplifier is well-known in the art and described, for example, in a copending U.S. patent application entitled "A Tapered Beam Expander Waveguide Integrated With a Diode Laser," Applicants Docket (Ben-Michael 1–17) and assigned to the same assignee as the present application, incorporated herein by reference; and also described in the U.S. Pat. No. 5,579,155 issued Nov. 26, 1996 and incorporated herein by reference.

Generally, beam expander 16 is fabricated in a form of a tapered waveguide by employing standard techniques, such as molecular beam epitaxy, vapor phase epitaxy, or Metal Oxide Chemical Vapor Deposition (MOCVD). Further information on MOCVD and other fabrication techniques is provided in AT&T Technical Journal, Vol. 68, No. 1 (January/February 1989). As illustrated, beam expander 16 is tapered in such a way as to define a pointed edge at its light receiving/transmitting end. Beam expander 16 provides an improved optical coupling between semiconductor optical device 12 and a fiber optic coupled to the optical device as explained hereinafter.

Optical amplifier 14 is fabricated in a form of few layers such as a cladding layer 27 disposed over a multiple quantum well 28, which generates a light beam when the section defining optical amplifier 14 is excited or pumped by an electric current provided via metal contact 18.

An anti-reflective coating 20 is disposed at one end of the semiconductor optical device such as 26. Semiconductor optical device 12 is configured to be coupled to a fiber optic 24 that employs an index matching gel 22 at its end portion, although the invention is not limited in scope in that respect. For example, the index matching gel 22, in accordance with one method of implementing optical coupling in accordance with the present invention, may be applied to the antireflective coating 20. Thereafter, the tip of optical fiber 24 is disposed over index matching gel 22.

The refractive index of the index matching gel 22 is substantially the same as the core material of optical fiber 24. However, the index matching gel is made of a material that is substantially softer than the core of the optical fiber 24. It is noted that instead of an index matching gel, an epoxy layer may also be employed in accordance with the present invention.

In accordance with one embodiment of the present invention, antireflective layer 20 is configured so as to substantially reduce reflections caused because of the inequality between the refractive index of the optical fiber and the refractive index of the semiconductor optical device. The characteristics of an appropriate antireflective material may be derived in accordance with known techniques. The required refractive index of the antireflective material is among other things a function of the refractive indices of the materials surrounding it. When the antireflective material is disposed as a layer between two other materials, such as fiber optic 24 and semiconductor optical device 12, as illustrated in FIG. 1, $$n_{AR} = \sqrt{n_{OF} * n_{SO}} \qquad (1)$$

wherein $n_{AR}$ is the index of refraction of antireflective layer 20, $n_{OF}$ is the index of refraction of optical fiber 24 and $n_{SO}$ is the index of refraction of semiconductor optical device 12. In accordance with one embodiment of the present invention, the semiconductor optical device is made of Indium Phosphide with an index of refraction of approximately, 3.26. The optical fiber is made of glass with an index of refraction of approximately 1.47. Thus, the index of refraction of antireflective layer 20 is approximately 2.2. Preferably, antireflective layer 20 is made of Titanium Oxide $TiO_2$, which has an index of refraction of approximately 2.2.

Furthermore the thickness "T" of $TiO_2$ layer is approximately $$T = \frac{\lambda}{n_{AR} \cdot 4} \qquad (2)$$

wherein $\lambda$ is the wavelength of the light beam that travels between optical fiber 24 and semiconductor optical device 12, and $n_{AR}$ is the refractive index of the antireflection material.

Figure 2:
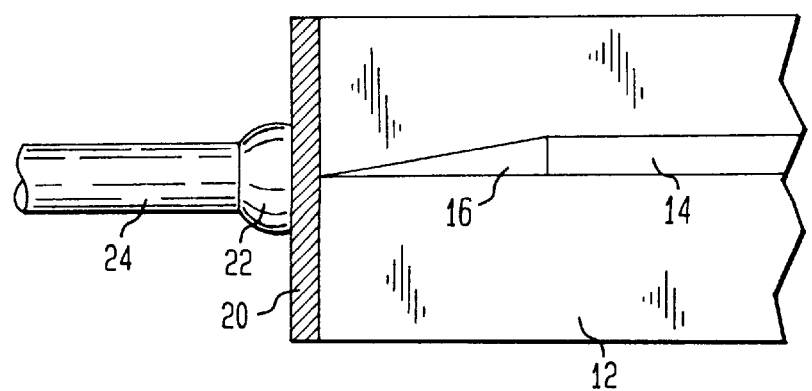
FIG. 2 illustrates a side view of the arrangement illustrated in FIG. 1 in accordance with one embodiment of the present invention.

FIG. 2 illustrates a side view of the arrangement illustrated in FIG. 1 in accordance with one embodiment of the invention. As illustrated, in accordance with the present invention, index matching gel or epoxy 22 allows fiber optic 24 to be coupled to semiconductor optical device 12 without the need for an air gap. Furthermore, because the semiconductor optical device includes a beam expander, fiber optic 24 does not require a fiber lens, which due to its sharp tip, may cause damage to the surface of semiconductor optical device.

It is noted that in accordance with another embodiment of the invention the antireflective layer is disposed over the end portion of the fiber optic 24, and index matching gel or epoxy layer 22 is disposed at one end of semiconductor optical device 26.

Figure 3:
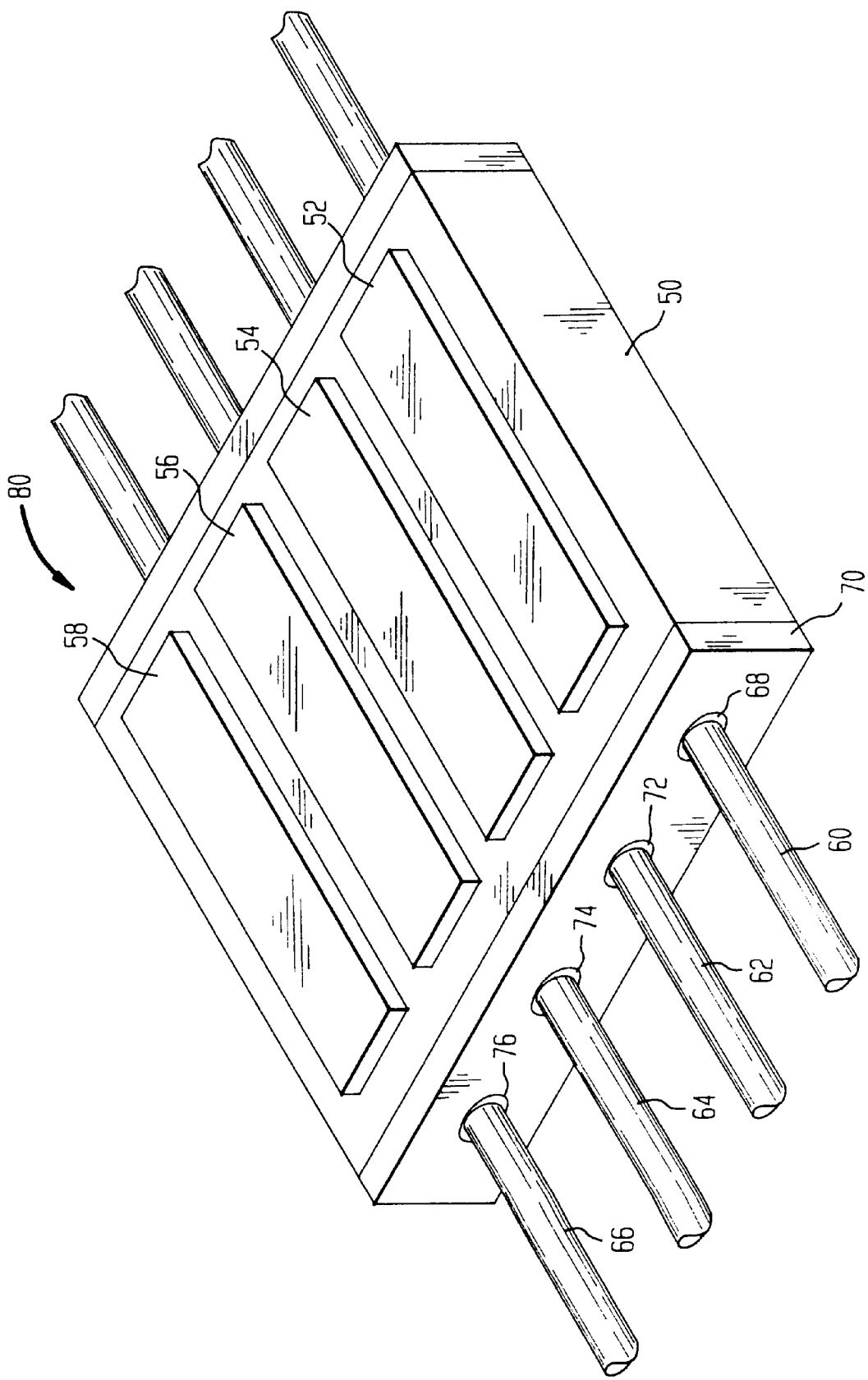
FIG. 3 illustrates a three dimensional illustration of a coupling system in accordance with another embodiment of the invention.

The relative ease to form the optical coupling system in accordance with the present invention and its low cost, allows optical coupling arrangements that are more complex than before. For example, FIG. 3 illustrates a semiconductor optical device 50 that includes an optical amplifier array 80. For example, optical device 50 as illustrated in FIG. 3 includes four optical amplifiers, each coupled to a corresponding optical fiber, such as 60, 62, 64 and 66, via index matching gel elements such as 68, 72, 74 and 76 respectively. An antireflective coating 70 is employed to substantially reduce light reflections, when a light beam travels from an optical fiber to a corresponding beam expander (not shown), within the semiconductor optical device. A plurality of metal contacts such as 52, 54, 56, and 58 are disposed in an area over each optical amplifier for providing appropriate current signals.

It is noted that in accordance with another embodiment of the present invention, the semiconductor opitcal device may employ a plurality of waveguides, such as in a multiplexer/demultiplexer, wherein each waveguide is coupled to an optical fiber employing the arrangement in accordance with the present invention.

Figure 4:
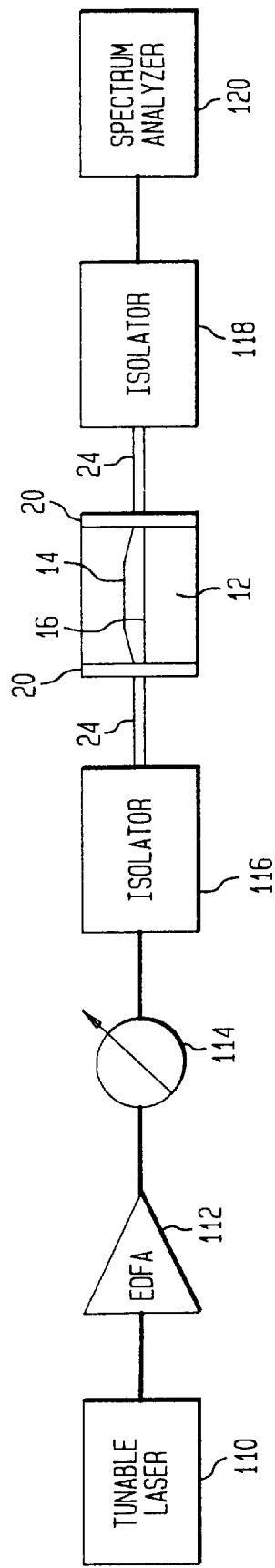
FIG. 4 illustrates an experimental setup configured to measure the spectral characteristics of the coupling system provided in accordance with the present invention.
Figure 5:
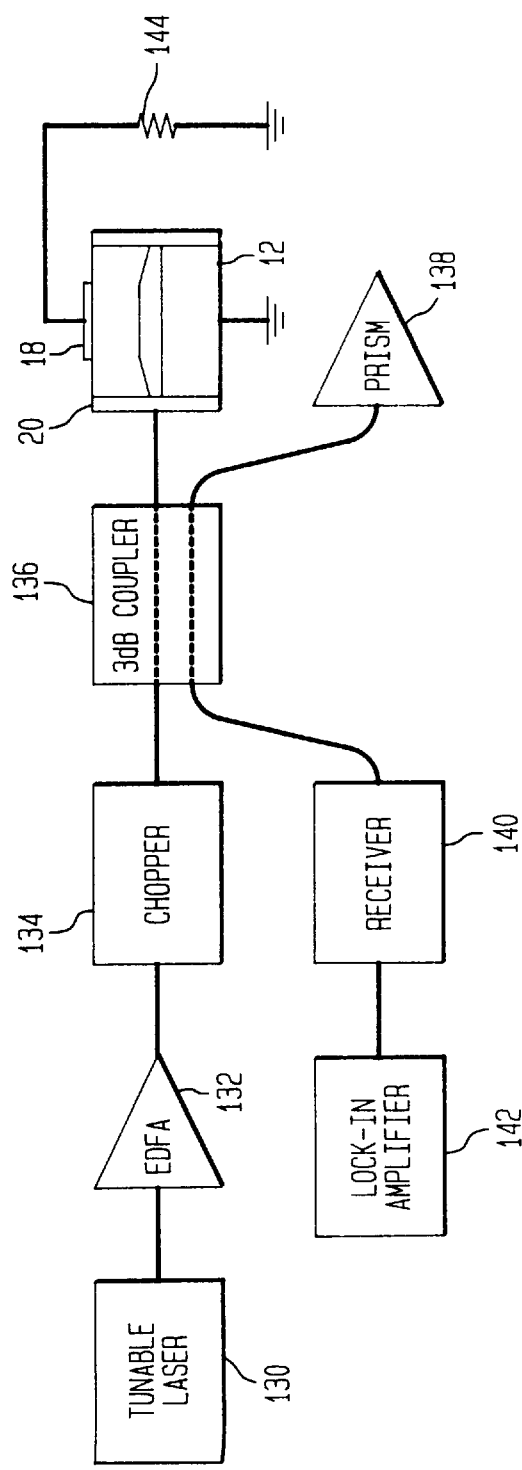
FIG. 5 illustrates another experimental setup configured to measure the characteristics of the coupling system provided in accordance with the present invention.

FIGS. 4 and 5 illustrate an experimental setup for measuring the characteristics of a semiconductor optical amplifier array, wherein four optical amplifiers as illustrated in FIG. 3 are disposed within the semiconductor optical device. In accordance with one embodiment of the invention the device may be grown by atmospheric pressure in order to form multiple quantum wells comprising of four compression and four tensile strained stack for polarization-independent gain in the 1.55 $\mu$m spectral region, as described in "1.5 $\mu$m Multiquantum-Well Semiconductor Optical Amplifier with Tensile and Compressively Strained Wells for Polarization-Independent Gain," IEEE Photo. Technol. Lett., vol. 14, pp. 406–408 (April 1993), and incorporated herein by reference. This quantum well stack results in less than 1dB polarization sensitivity of the amplifier gain over a wide wavelength range. The semiconductor optical device in accordance with one embodiment of the present invention is formed by Ppro-3 photonic process as described in *Ppro-3. A New Process for Integration of Semiconductor Active and Passive Optical Waveguide*

*Devices* 8th European Conference on Integrated Optics, Stockholm, EFB2, Apr. 1997 and incorporated herein by reference.

In accordance with one embodiment of the invention the active section of the amplifier is 750 μm long and 3.5 μm wide. The length of the taper that forms the beam expander is 250 μm at both sides. The beam expander is tapered both in the horizontal and vertical directions. The horizontal taper is made with waveguide mask design. The vertical taper is formed by selective area etching SAE as described in *Local Etch Rate Control of Masked InP/InGaAsP by Diffusion Limited Etching* J. Electrochemical Soc. vol. 141 pp. 1954–1957, (1994), and incorporated herein by reference.

In an experimental setup a sample of 32 semiconductor devices coupled to a plurality of optical fibers in accordance with the present invention were measured. FIG. 4 illustrates a setup for measuring the amplifier array characteristics. A laser 110 provides light beams to an Erbium Doped Fiber Amplifier EDFA 112. An attenuator 114 is configured to receive light from EDFA 112 and provide variable optical power to isolator 116. An isolator 116 receives light from attenuator 114 and provides light to optical fiber 24. It is noted that although one optical fiber 24 is illustrated herein, for a semiconductor optical device with multiple amplifiers, there is as many optical fibers as there are amplifier arrays within the semiconductor optical device. Semiconductor optical device 12 is configured to be coupled to optical fiber 24 in accordance with one embodiment of the invention by employing index matching gel and antireflective coating. An isolator 118 receives light from semiconductor optical device 12 and provides that to a spectral analyzer/power monitor 120.

Figure 6A:
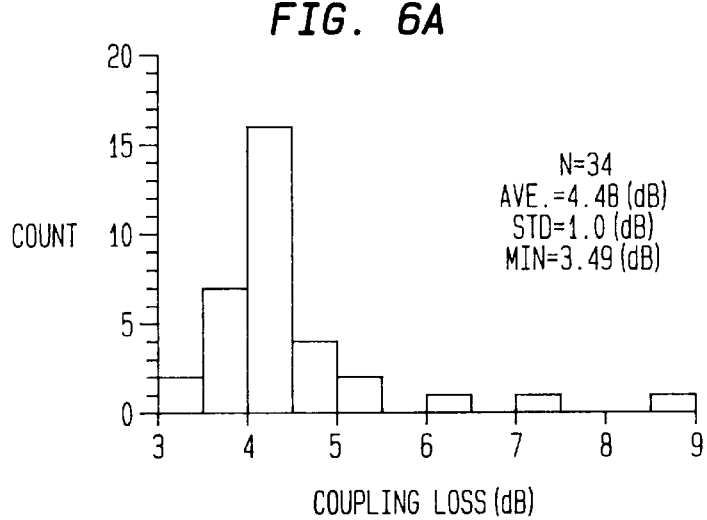
FIGS. 6a–6e are plots illustrating the statistical measurement of a plurality of coupling systems provided in accordance with the present invention.
Figure 6B:
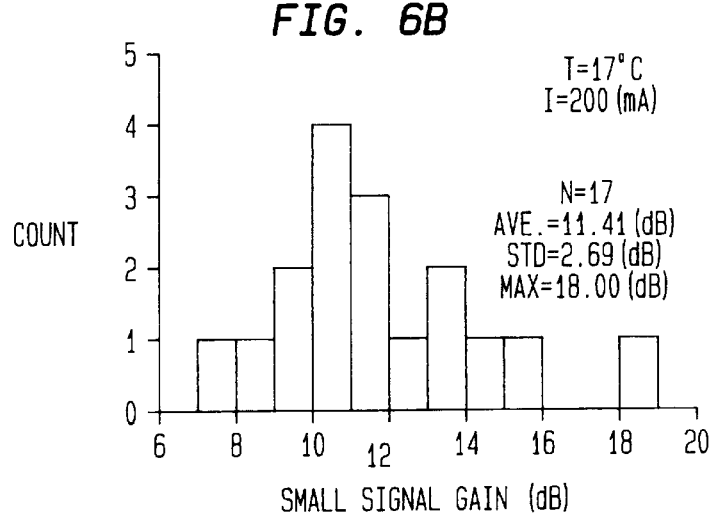
Figure 6C:
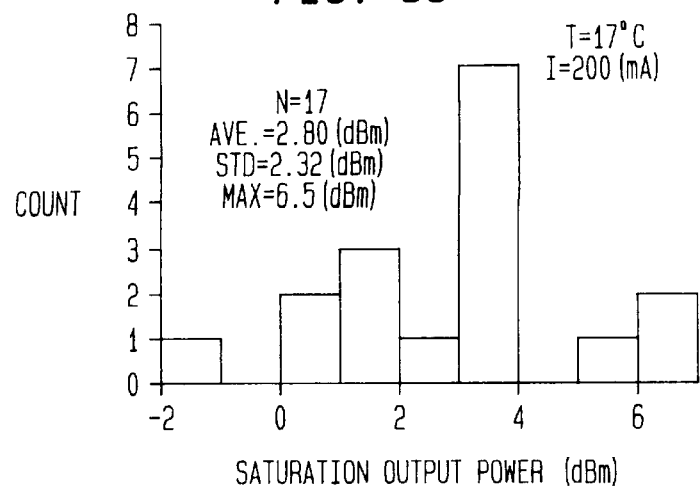
Figure 6D:
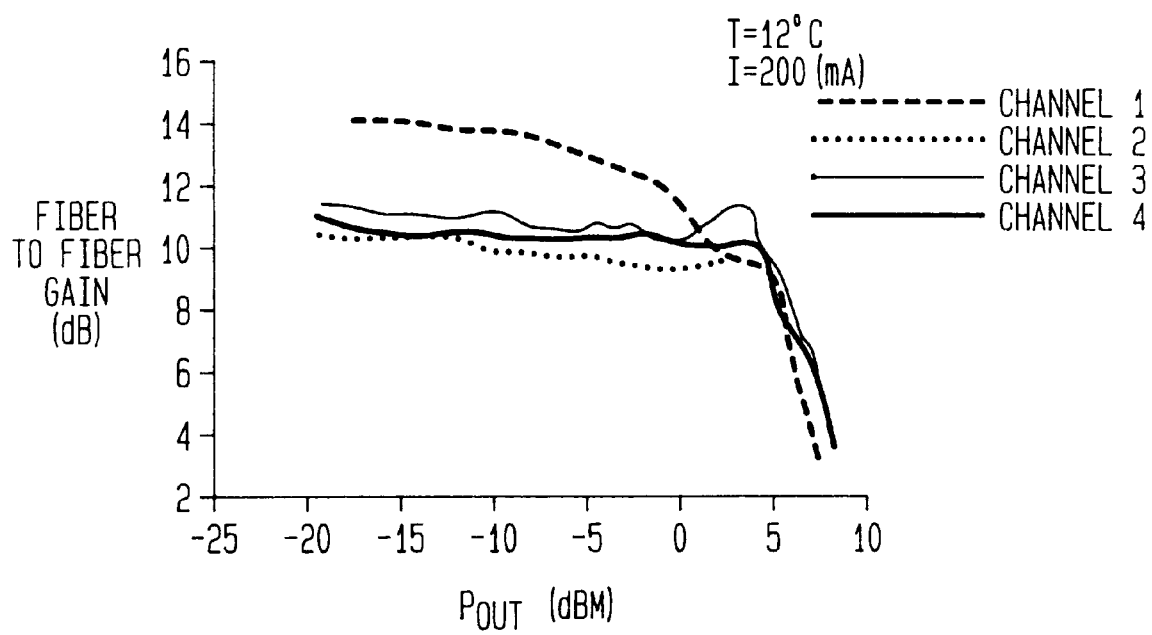
Figure 6E:
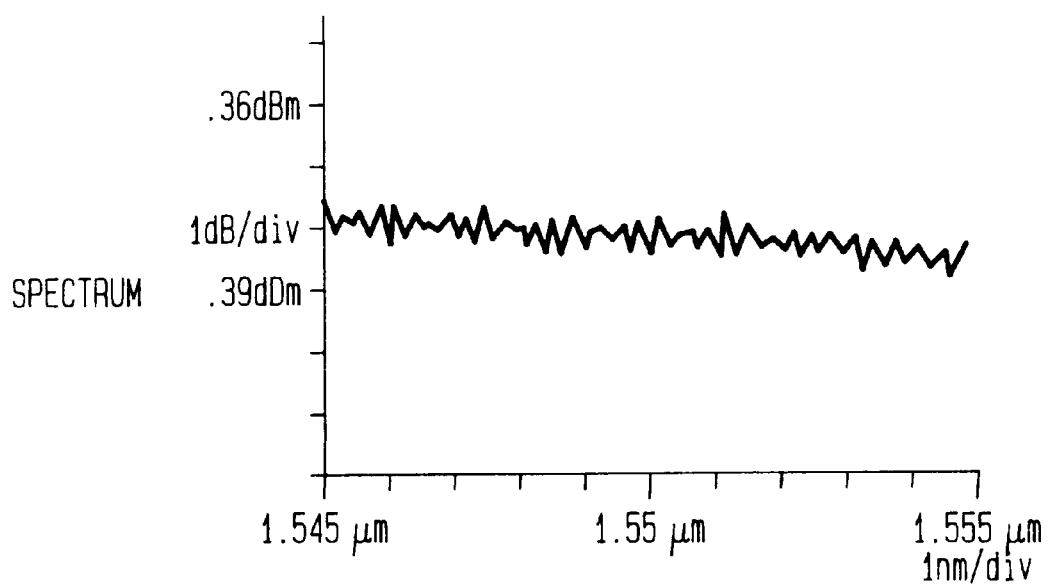

FIG. 6a is a plot of a statistical histogram of the coupling loss of a coupling system in accordance with one embodiment of the present invention. The coupling loss is estimated by measuring the photo current at zero bias. FIG. 6d illustrates the gain curves of a four amplifier array having a coupling system in accordance with one embodiment of the present invention. FIG. 6b is the histogram of fiber to fiber small signal gain. FIG. 6c is the histogram of a fiber coupled saturation output power.

FIG. 5 illustrates an experimental setup for measuring the reflection between optical fiber and semiconductor optical device. A laser 130 is configured so as to provide light to amplifier 132. A chopper 134 receives and modulates the light beam received from amplifier 132. The output of chopper 134 is coupled to an input of a 3dB coupler 136. The light provided by coupler 136 is directed to optical semiconductor device 12 in accordance with one embodiment of the present invention. A 10 ohm resistor 144 connects metal plate 18 to ground so that all photon current signals are absorbed and no reflection occurs from the right section of semiconductor optical device 12. Furthermore, the beam impinging on the prism is deflected. The 3dB coupler also provides a portion of light reflected from the optical fiber/ semiconductor optical device junction to a receiver 140. The output signal or receiver 140 is coupled to an input terminal of a lock-in amplifier 142, which is synchronized with the chopper to measure the modulated signal. Residual facet reflection in the range of $1\times10^{-5}$–$\times3\times10^{-4}$ has been measured using this method.

Thus, the present invention advantageously provides for a coupling system that couples an optical fiber to a semiconductor optical device by eliminating fiber lenses and alignment of coupled devices. The index matching gel in combination with antireflective coating layer and the beam expander within the optical device provide for quick and inexpensive coupling systems. At the same time the properties of the coupling system are characterized by substantially low light reflection, less breakage and harm to semiconductor optical devices. These benefits in turn lead to higher volume fiber connections, such as employment of fiber optics to businesses and residences at a more expedited basis.

Furthermore, the present invention substantially eliminates the disadvantages associated with typical coupling arrangements which employ an air gap between the optical fiber and the semiconductor optical device. Such coupling arrangements require the use of two antireflective materials between the opitcal fiber and air, and, between air and the semiconductor optical device. The use of two antireflective materials leads to higher manufacturing costs.

In addition, the presence of the air gap causes a greater optical mismatch than the coupling arrangement of the present invention where the presence of air gap is not necessary. As mentioned earlier, the refractive index of semiconductor optical device is about 3.3 and the refractive index of optical fiber is about 1.5. The refractive index of air is about 1. Thus, in coupling arrangements having an air gap the total mismatch is about 2.8 ((3.3−1)+(1.5−1)). Whereas the mismatch in accordance with the present invention is about 1.8 (3.3(semiconductor) −1.5(optical fiber)).

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. An optical coupling system used to couple an optical fiber to an optical semiconductor device comprising:
    a beam expander disposed within said optical semiconductor device and configured to carry light travelling through said optical fiber;
    an antireflective layer disposed on at least one surface of the semiconductor optical device, said antireflective layer is made of a material that substantially reduces light reflections between said optical fiber and said optical semiconductor material; and
    an optical index matching layer disposed over said antireflective layer, said optical index matching layer is configured to receive the end portion of said optical fiber.

2. An optical coupling system in accordance with claim 1 wherein said optical index matching layer is made of gel or epoxy.

3. An optical coupling system in accordance with claim 2, wherein said semiconductor optical device is substantially made of Indium Phosphide and said antireflective layer is made of Titanium Oxide.

4. An optical coupling system in accordance with claim 3, wherein the thickness "T" of said antireflective layer is approximately $$T = \frac{\lambda}{n_{AR} \cdot 4} \qquad (2)$$

wherein λ is the wavelength of the light beam that travels between said optical fiber and said semiconductor optical device, and $n_{AR}$ is the refractive index of the antireflection material.

5. An optical coupling system in accordance with claim 1 wherein said semiconductor optical device further comprises an optical amplifier coupled to said beam expander and configured to amplify light travelling through said beam expander.

6. An optical coupling system in accordance with claim 5 wherein said beam expander is defined by a tapered waveguide.

7. An optical coupling system in accordance with claim 6, wherein said tapered waveguide is further defined by horizontally and vertically tapered walls.

8. An optical coupling system used to couple a plurality of optical fibers to an optical semiconductor device comprising:

a plurality of beam expanders defined by a tapered waveguide disposed within said optical semiconductor device, each of said beam expanders configured to carry light travelling through a corresponding one of said optical fibers;

an antireflective layer disposed on at least one surface of the semiconductor optical device, said antireflective layer is made of a material that substantially reduces light reflections between said optical fibers and said optical semiconductor material; and an optical index matching layer disposed over said antireflective layer, said optical index matching gel or epoxy layer configured to receive the end portion of each one of said optical fibers.

9. An optical coupling system in accordance with claim 8, wherein said optical index matching layer is made of gel or epoxy.

10. An optical coupling system in accordance with claim 8, wherein said semiconductor optical device is substantially made of Indium Phosphide and said antireflective layer is made of Titanium Oxide.

11. An optical coupling system in accordance with claim 9, wherein the thickness "T" of said antireflective layer is approximately $$T = \frac{\lambda}{n_{AR} \cdot 4} \quad (2)$$

wherein λ is the wavelength of the light beam that travels between said optical fiber and said semiconductor optical device, and $n_{AR}$ is the refractive index of the antireflection material.

12. An optical coupling system in accordance with claim 8 wherein said semiconductor optical device further comprises an array of optical waveguides configured to receive light from said beam expander.

13. An optical coupling system in accordance with claim 8, wherein said semiconductor optical device further comprises an array of optical devices configured to receive light from said beam expander.

14. An optical coupling system in accordance with claim 8, wherein said tapered waveguide is further defined by horizontally and vertically tapered walls.

15. A method for coupling an optical fiber to a semiconductor optical device, comprising the steps of:

disposing a layer of antireflective material over a surface of said semiconductor optical device;

disposing a layer of index matching material over the end portion of said optical fiber, said index matching material layer having a refractive index that is substantially equal to a refractive index of said optical fiber; and coupling said optical fiber to said surface of said semiconductor optical device, such that said index matching material and said antireflective layer are substantially attached.

16. The method in accordance with claim 15 wherein said layer of index matching material is made of gel or epoxy.

17. The method in accordance with claim 15 wherein said semiconductor optical device further comprises a beam expander defined by a tapered waveguide configured to receive light beams from said optical fiber.

18. The method in accordance with claim 17, wherein said step of disposing antireflective material further comprises the step of disposing a Titanium Oxide layer.

19. The method in accordance with claim 15, further comprising the step of coupling a plurality of said optical fibers to said optical semiconductor device via said index matching gel and said antireflective layer.

20. The method in accordance with claim 19 wherein said semiconductor optical device comprises a plurality of optical devices.

21. The method in accordance with claim 20, wherein said optical devices comprise an array of optical amplifiers.

22. An optical coupling system used to couple an optical fiber to an optical semiconductor device comprising:

a beam expander disposed within said optical semiconductor device and configured to receive light from said optical fiber;

an optical index matching gel disposed on at least one surface of the semiconductor optical device; and an antireflective layer disposed over said optical fiber, said antireflective layer is made of a material that substantially reduces light reflections between said optical fiber and said optical semiconductor material.

23. An optical coupling system in accordance with claim 22, wherein said semiconductor optical device is substantially made of Indium Phosphate and said antireflective layer is made of Titanium Oxide.

24. An optical coupling system in accordance with claim 23 wherein said beam expander is defined by a tapered waveguide.

25. An optical coupling system in accordance with claim 22, wherein said tapered waveguide is further defined by horizontally and vertically tapered walls.

26. An optical coupling system used to couple an optical fiber to an optical semiconductor device comprising:

an antireflective layer disposed on at least one surface of said semiconductor optical device, said antireflective layer is made of a material that substantially reduces light reflections between said optical fiber and said optical semiconductor material; and an optical index matching layer disposed over said antireflective layer, said optical index matching layer having a refractive index that is substantially equal to a refractive index of said optical fiber, said optical index matching layer configured to receive the end portion of said optical fiber.

27. An optical coupling system in accordance with claim 26, wherein said optical index matching layer is made of gel or epoxy.

28. An optical coupling system in accordance with claim 26, wherein said semiconductor optical device is substantially made of Indium Phosphide and said antireflective layer is made of Titanium Oxide.

\* \* \* \* \*